Patented Jan. 8, 1952

2,581,336

UNITED STATES PATENT OFFICE 2,581,336

PHENOXYETHYL-DIMETHYL-DODECYL-AMMONIUM HALIDES

Max Hartmann and Werner Bosshard, Riehen, Switzerland, assignors to Ciba Pharmaceutical Products, Inc., Summit, N. J.

No Drawing. Application December 19, 1949, Serial No. 133,952. In Switzerland November 24, 1944

2 Claims. (Cl. 260—567.6)

This application is a continuation-in-part of our copending application Serial No. 622,690, filed October 16, 1945, now abandoned.

It is known that aryloxyalkyl-ammonium compounds which are derived from bivalent phenols have disinfectant properties. These compounds are not entirely satisfactory from the standpoint of activity and, moreover, entail the disadvantage that the starting materials required for the preparation thereof are of relatively complex constitution.

A desideratum, to the achievement of which the present invention is directed, is the embodiment of two new compounds of the said general type, characterized by enhanced disinfectant properties and obtainable from starting materials of less complexity.

This is realized by the present invention, according to which disinfecting and preserving preparations are obtained by the production of a phenoxyethyl - dimethyl - dodecyl - ammonium halide of the formula

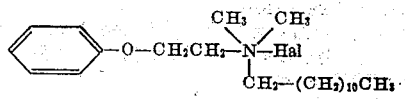

wherein Hal stands for a chlorine or a bromine atom. An advantage of the present invention thus resides in the use of starting materials of simpler constitution, the products thus obtained having surprisingly more valuable properties than the above named compounds.

In addition to their characteristic of having a dodecyl group linked to the quaternary nitrogen atom, it is further prerequisite to the achievement of the results sought by the present invention that the active compounds be dimethylated at such nitrogen atom and that the benzene nucleus of the phenoxy moity thereof be free of substituents. These conditions are satisfied by each of these compounds.

To produce the new compounds, phenoxyethyl-dimethyl-amine is quaternated with dodecyl chloride or dodecyl bromide. The phenoxyethyl-dimethylamine named as starting material is known. It may be prepared, for example, by reacting phenoxyethylene with methylamine and subsequently methylating the obtained β-phenoxyethyl-methyl-amine with formic acid and formaldehyde.

The new compounds may furthermore be produced also by causing phenoxyethyl-chloride or bromide to act on dimethyl-dodecylamine.

The products resulting from the instant process are soluble in water and constitute well crystallizing compounds. Their disinfecting and preserving properties are good and they are suitable as disinfectant and preservative preparations for a very wide range of application. They may be used for disinfecting the skin, for instance the hands, instruments, bandage material, washes and the like, as well as for disinfecting or preserving human or animal foodstuffs. They may be used alone or mixed in the form of solutions or emulsions and/or in admixture with other active or inert substances, such as salves, or as dusting powder.

As hereinbefore indicated, it has been found that, in order to realize the desideratum of the present invention, it is essential that the benzene nucleus of the phenoxy moiety of the active compounds according to the invention, be free of substituents and, more especially, free of substituents containing three or more carbon atoms. It is also essential that the alkyl groups attached to the quaternary nitrogen comprise two methyl groups and one dodecyl group. The following table shows a comparison of disinfectant activity between, on the one hand, a preferred and representative compound according to the invention, and on the other hand related compounds wherein, however:

(a) The benzene nucleus of the phenoxy moiety is substituted;

(b) The N-lower-alkyl substituents on the quaternary nitrogen are other than methyl groups; and (c) There is no aliphatic hydrocarbon radical on the said nitrogen atom, with 12 carbon atoms, Table

| | Substance | Bacteria coli Concentration | Min. |
|---|---|---|---|
| I | C₆H₅—O—CH₂—CH₂—N⁺(CH₃)(CH₃)—(CH₂)₁₁·CH₃  Br⁻ | 1:8000 | 2½ |
| II | (OC₈H₁₇)C₆H₄—O—CH₂—CH₂—N⁺(CH₃)(CH₃)(CH₂)—CH₂—C₆H₅  Cl⁻ | 1:1000 | 2½–5 |
| III | (OC₁₂H₂₅)C₆H₄—O—CH₂—CH₂—N⁺(CH₃)(CH₃)(CH₂)—CH₂—C₆H₅  Cl⁻ | 1:1000 | 60 |
| IV | (OC₁₂H₂₅)C₆H₄—O—CH₂—CH₂—N⁺(CH₃)(CH₃)—CH₂—C₆H₅  Cl⁻ | 1:1000 | 2½ |
| V | (OC₁₂H₂₅)C₆H₄—O—CH₂—CH₂—N⁺(CH₃)(CH₃)—(CH₂)₁₁—CH₃  Br⁻ | 1:1000 | >60 |
| VI | C₆H₅—O—CH₂—CH₂—N⁺(CH₃)(CH₃)(CH₂)—(CH₂)₁₁—CH₃  Br⁻ | 1:4000 | >60 |
| VII | C₆H₅—O—CH₂—CH₂—N⁺(CH₃)(CH₃)—CH₂—C₆H₅  Cl⁻ | 1:1000 | >60 |
| VIII | (t)—H₁₇C₈—C₆H₄—O—CH₂—CH₂—N⁺(CH₃)(CH₃)—(CH₂)₁₁—CH₃  Br⁻ | 1:1000 | 2½ |

The procedure followed in obtaining the foregoing results is as follows:

The antiseptic is tested in series of 4 concentrations in peptone bouillon tubes. 0.2 cc. of a 24 hour old microbe culture is introduced into each of the four tubes at intervals of 30 seconds. The tubes, when ready for the experiment, contain an average of 5 cc. After 2½ minutes of contact, a loopful of the contents of each tube is transferred by means of a platinum loop into 5 cc. of fresh bouillon. These transfers are renewed every 2½ minutes, i. e. at the end of 5, 7½, 10, 12½, 15 minutes, etc.

The simultaneous testing of a series of 4 concentrations of antiseptic is the maximum which still permits of careful manipulations and transfers. The subcultures containing the transferred material are put into an incubator where they are left for 4 days at 37° C. A control tube without antisepetic substance permits of the verification of the regular growth of the germs in question.

The table indicates the dilutions in which the compounds concerned have a bactericidal effect after a specified period of time.

The following example illustrates the invention but is not to be regarded as limiting it in any way, the parts being by weight:

*Example*

7 parts of β-phenoxyethyl-dimethylamine are heated for 2 hours on the boiling water-bath with 11 parts of dodecyl bromide. A good yield of β-phenoxy-ethyl-dimethyl-dodecyl-ammonium bromide is obtained which, after recrystallization from acetone, melts at 112° C. It is a white crystalline powder which dissolves easily in water to give a neutral reaction.

If, in the same manner, dodecyl chloride is reacted and the heating time is extended to 20 hours or if the bromide obtained as described above is shaken with silver chloride in alcohol for 20 hours at room temperature, β-phenoxyethyl-dimethyl-dodecyl-ammonium-chloride is obtained which melts at 129–130° C.

β - Phenoxyethyl - dimethyl - dodecyl - ammonium-bromide may alternatively be obtained by methylating β-phenoxyethyl-dodecylamine with formaldehyde and formic acid and subsequent quaternization with methyl bromide. β-Phenoxyethyl-dodecylamine is produced by causing dodecylamine to react with β-phenoxyethyl-bromide.

85 parts of the β-phenoxyethyl-dimethyl-dodecyl-ammonium bromide obtained as herein described and 15 parts of starch, if necessary with the addition of agents enhancing the solubility in water, are made into tablets which may be used as disinfecting and preserving preparations.

Having thus described the invention what is claimed is:

1. A β-phenoxylethyl - dimethyl-dodecyl-ammonium halide of the formula

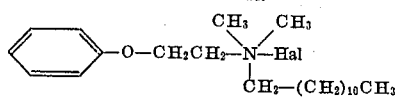

wherein Hal stands for a member of the group consisting of chlorine and bromine atoms.

2. β - Phenoxyethyl - dimethyl - dodecyl - ammonium bromide of the formula

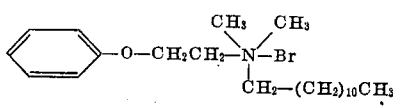

MAX HARTMANN.
WERNER BOSSHARD.

REFERENCES CITED

The following references are of record in the file of this patent:

UNITED STATES PATENTS

| Number | Name | Date |
|---|---|---|
| 2,471,622 | Hartmann et al. | May 31, 1948 |

FOREIGN PATENTS

| Number | Country | Date |
|---|---|---|
| 484,906 | Great Britain | May 9, 1938 |
| 493,865 | Great Britain | Oct. 17, 1938 |
| 72,039 | Norway | May 5, 1947 |